(12) United States Patent
Edge

(10) Patent No.: US 7,084,993 B2
(45) Date of Patent: Aug. 1, 2006

(54) CUSTOMER CHARGE ACCOUNTING IN A SOFT COLOR PROOFING SYSTEM

(75) Inventor: Christopher J. Edge, St. Paul, MN (US)

(73) Assignee: Kodak Polychrome Graphics LLC, Norwalk, CT (US)

( * ) Notice: Subject to any disclaimer, the term of this patent is extended or adjusted under 35 U.S.C. 154(b) by 239 days.

(21) Appl. No.: 10/223,586

(22) Filed: Aug. 16, 2002

(65) Prior Publication Data

US 2004/0032606 A1   Feb. 19, 2004

(51) Int. Cl.
G06F 15/00 (2006.01)
G06Q 30/00 (2006.01)

(52) U.S. Cl. .................. 358/1.13; 715/527; 705/52
(58) Field of Classification Search .......... 358/1.1–1.9, 358/540, 452, 1.11–1.18; 345/732, 744, 345/730, 472, 472.1, 472.2, 788, 798, 800, 345/801; 715/505, 507, 508, 527, 500; 725/10; 705/52

See application file for complete search history.

(56) References Cited

U.S. PATENT DOCUMENTS

| | | | |
|---|---|---|---|
| 5,739,809 A | 4/1998 | McLaughlin et al. | |
| 6,044,405 A | 3/2000 | Driscoll, III et al. | |
| 6,069,601 A | 5/2000 | Lind et al. | |
| 6,332,146 B1 | 12/2001 | Jebens et al. | |
| 6,529,214 B1 * | 3/2003 | Chase et al. | 715/744 |
| 6,608,697 B1 | 8/2003 | Schorr et al. | |
| 6,839,149 B1 * | 1/2005 | Herr | 358/1.15 |

OTHER PUBLICATIONS

Copy of International Preliminary Examination Report for International Application No. PCT/US2003/25496, filed Aug. 13, 2003, 3 pgs.
International Search Report for PCT/US03/25496, dated Nov. 24, 2004.

* cited by examiner

Primary Examiner—King Y. Poon

(57) ABSTRACT

Techniques for customer charge accounting in a soft proofing system take into account one or more factors associated with a hard copy proofing job simulated by the soft proofing system. The charge for the soft proofing job can be correlated, at least in part, to the overall cost of the hard copy proofing job emulated by the soft proofing job. The factors use to calculate the customer charge for a soft proofing job may include, for example, comparable hard copy equipment costs, comparable hard copy media costs, hard copy delivery costs, avoidance of delivery and production delays relative to hard copy proofing, and the number of users that view the hard copy proofing job. A value scale factor may be applied to a base cost for a given soft proof, thereby yielding a cost that can be charged to the customer.

9 Claims, 6 Drawing Sheets

CUSTOMER CHARGE ACCOUNTING IN A SOFT COLOR PROOFING SYSTEM

FIELD

The invention relates to color imaging and, more particularly, to soft color proofing systems.

BACKGROUND

Soft color proofing refers to a proofing process that makes use of a display device rather than a printed hard copy. Traditionally, color proofing techniques have relied on hard copy proofing, where proofs are printed and inspected to ensure that the images and colors on the print media look visually correct. For instance, color characteristics can be adjusted and successive hard copy prints can be examined in a hard proofing process. After determining that a particular proof is acceptable, the color characteristics used to make the acceptable proof can be reused to mass-produce, e.g., on a printing press, large quantities of print media that look visually equivalent to the acceptable proof.

Soft color proofing is desirable for many reasons. For instance, soft proofing can eliminate or reduce the need to print hard copies on media during the proofing process. Moreover, soft proofing may allow multiple proofing reviewers to proof color images from remote locations simply by looking at display devices. With soft proofing, there is no need to print and deliver hard copy proofs to remote reviewers. Thus, soft proofing can be faster and more convenient than hard copy proofing. Moreover, soft proofing can reduce the cost of the proofing process, including hardware, material and delivery costs. For these and other reasons, soft proofing is highly desirable.

SUMMARY

The invention is directed to techniques for customer charge accounting in a soft color proofing system. In calculating a customer charge for a soft proofing job, the techniques described herein may take into account one or more factors associated with a comparable hard copy proofing job. In this manner, the charge for the soft proofing job can be correlated, at least in part, to the overall cost of the hard copy proofing job emulated by the soft proofing job.

The factors used to calculate the customer charge for a soft proofing job may include, for example, comparable hard copy equipment costs, comparable hard copy media costs, hard copy delivery costs, avoidance of delivery and production delays relative to hard copy proofing, and the number of users that view the hard copy proofing job. The techniques also may involve the calculation of a value scale factor, and application of the value scale factor to a base cost for a given soft proof, thereby yielding a cost that can be charged to the customer.

In one embodiment, the invention provides a method comprising determining a charge for a soft proofing job based on one or more factors associated with a comparable hard copy proofing job. The invention also provides a computer-readable medium comprising instructions for performing such a method.

In another embodiment, the invention provides a system comprising a color proofing server that serves a soft proofing job to a user, and an accounting server that determines a charge for the soft proofing job based on one or more factors associated with a comparable hard copy proofing job.

In a further embodiment, the invention provides a method comprising determining a cost associated with hard copy equipment used for a hard copy proofing job, determining a cost associated with hard copy media used for the hard copy proofing job, and determining a cost associated with delivery of the hard copy proofing job to a customer. The method also comprises determining a charge for a soft proofing job that approximates the hard copy proofing job based on the determined costs and a number of viewers that access the soft proofing job. The invention also provides a computer-readable medium comprising instructions for performing such a method.

The invention can provide one or more advantages. For example, the invention provides a technique for systematically determining customer charges for color proofing jobs in a soft proofing system. The customer charges have a relationship to the actual value delivered by the soft proofing job, especially for customers who are accustomed to the cost structure of hard copy proofing jobs. In particular, the actual value of the soft proofing job can be determined in view of the cost of a comparable hard copy job. In this manner, the invention can provide an appropriate and sustainable revenue model that is generally consistent with the value perceived by the customer. The correlation of the cost of a soft proofing job to a comparable hard copy proofing job can provide vendors and customers with a more familiar pricing structure. In other words, the charge accounting technique may provide an extension to established economic processes in place within the industry, providing pricing for proofing vendors and customers that is at least partially derivative of the structure used for hard copy proofing practices. At the same time, however, a value scaling factor may be applied to account for differences between the soft proofing and hard copy proofing jobs, such as perceived quality and delivery and production delays.

Additional details of these and other embodiments are set forth in the accompanying drawings and the description below. Other features, objects and advantages will become apparent from the description and drawings, and from the claims.

DETAILED DESCRIPTION

Figure 1:
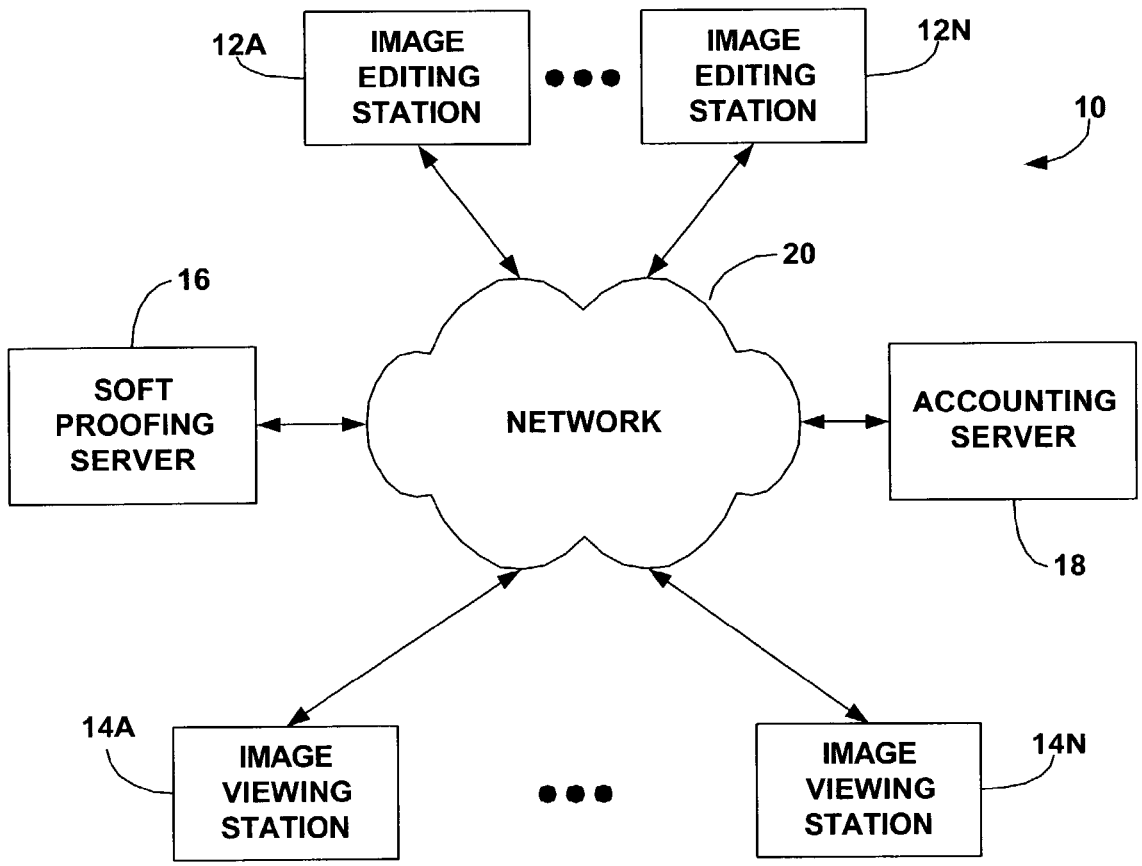
FIG. 1 is a block diagram of a soft proofing system.

FIG. 1 is a block diagram of a soft proofing system 10 that determines customer charges for a soft proofing job. As shown in FIG. 1, soft proofing system 10 may include one or more image editing stations 12A–12N, one or more image viewing stations 14A–14N, a soft proofing server 16, and an accounting server 18, all of which may be connected to a network 20 to deliver soft proofing jobs to customers and track customer charges associated with the soft proofing jobs. Network 20 may be a local or wide area network, or a global computer network such as the Internet.

In determining a customer charge for a soft proofing job, techniques implemented within system 10 may take into account one or more factors associated with a comparable hard copy proofing job. In this manner, the charge for the soft proofing job can be correlated, at least in part, to the cost of the comparable hard copy proofing job. The charge can be calculated automatically on a per-proof basis. In addition, in some embodiments, the customer charge determination may involve a value scaling factor that accounts for differences between the soft proofing and hard copy proofing jobs, such as perceived quality and production speed.

Image editing stations 12 may each include, for example, a computer workstation, a display device such as a cathode ray tube (CRT) or flat panel monitor, and user input media such as a keyboard and pointing device. Color proofing technicians may use image editing stations 12, along with appropriate image editing software, to prepare and edit soft proofing images for delivery to image viewing stations 14 via network 20. As will be described, image editing stations 12 may communicate the soft proofing images to image viewing stations 14 directly via email, or post the images to a network server, such as soft proofing server 16, for access by image viewing stations 14 via network 20.

Like image editing stations 12, image viewing stations 14 may each include a computer workstation, display device and user input media. Color proofing customers may use image viewing stations 14 to view soft proofing images and verify satisfactory color appearance. In some embodiments, image viewing stations 14 may be configured to permit customers to mark-up or attach comments to areas of interest within a soft proofing image. For example, the image viewing stations 14 may run a soft proofing software application similar to the Matchprint™ Virtual Proofing System, commercially available from Kodak Polychrome Graphics of Norwalk, Conn. In this manner, the customers may approve the images at image view stations 14 or return them, with applicable mark-ups and comments, to the color proofing technicians at image editing stations 12 for additional work. Once a user accepts an image, the image can be submitted for production, e.g., by printing on a printing press or other high volume printing device.

Soft proofing server 16 may take the form of an independent server coupled to network 20. Alternatively, soft proofing server 16 may be a server process running on an image editing station 12 or some other machine coupled to network 20. In general, soft proofing server 16 serves soft proofing jobs to users associated with image viewing stations 14. Also, soft proofing server 16 may serve the soft proofing jobs to image editing stations 12 when additional work on a soft proofing job is necessary, or when editing by a different image editing stations is desired. Soft proofing server 16 may forward soft proofing jobs to image viewing stations 14, e.g., by email, or store the soft proofing jobs for access by the image viewing stations. Hence, soft proofing server 16 may include or be attached to a data storage archive such as a hard drive, RAID, optical disk library, tape library, or the like.

Like soft proofing server 16, accounting server 18 may take the form of an independent server coupled to network 20 or a process running on a different machine coupled to network 20. For example, accounting server 18 may be a process running on soft proofing server 16 or image editing station 12. In general, accounting server 18 determines a customer charge associated with a particular soft proofing job. Accounting server 18 may make the charge determination, for example, upon delivery of a soft proofing job to an image viewing station 14, access to a soft proofing job by an image viewing station, receipt or acceptance of a soft proofing job request from a customer, or approval of a soft proofing job by a customer. In each case, accounting server 18 may apply the charge for the soft proofing job to an account established for the customer. Also, in some embodiments, accounting server 18 may apply additional charges to the account when additional image viewing stations 14 access the soft proofing job.

Figure 2:
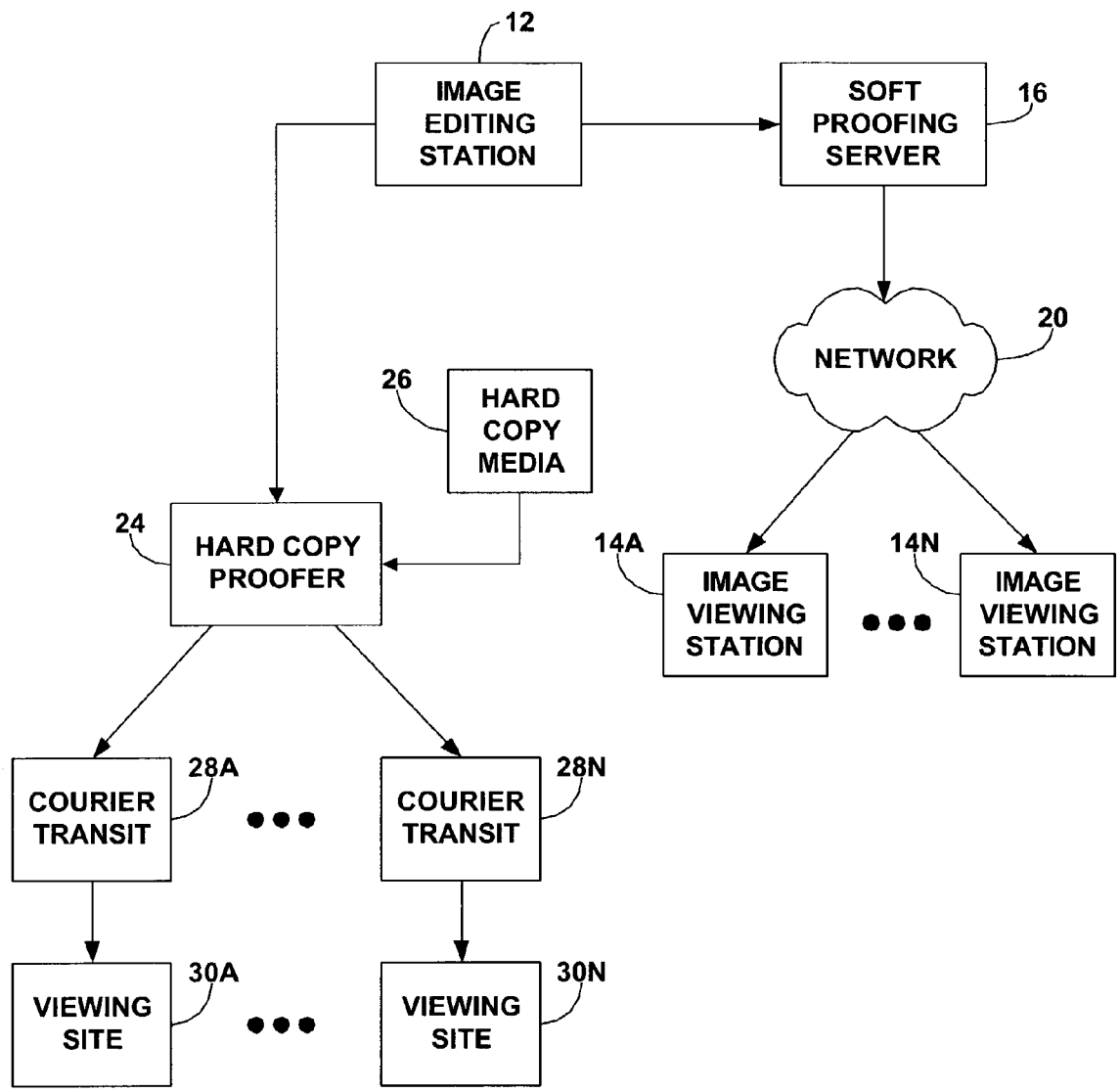
FIG. 2 is a block diagram illustrating soft proofing and hard proofing processes.

FIG. 2 is a block diagram illustrating the workflow associated with soft proofing and hard proofing processes for purposes of comparison. As shown in FIG. 2, an image editing station 12 may be used to prepare hard copy proofing jobs using a hard copy proofer 24 and hard copy proofing media 26. Alternatively, an image editing station 12 may be used to prepare soft proofing jobs delivered via soft proofing server 16. In each case, image editing station 12 produces an electronic image file to drive the output of either hard copy proofer 24 or image viewing station 14. In the case of a soft proofing job, a color proofing technician prepares an electronic image file on image editing station 12, and transmits the file electronically to one or more image viewing stations 14.

Again, soft proofing server 16 may be an independent server or simply a process running on image editing station 12. If soft proofing server 16 is an independent server, it may handle transmission of soft proofing jobs to multiple image editing stations 12. As mentioned above, soft proofing server 16 may be responsible for direct transmission of soft proofing jobs to image viewing stations 14 via network 20, e.g., by email. Alternatively, soft proofing server 16 may store soft proofing jobs for access by image viewing stations 14, e.g., via a web browser interface. In either case, notwithstanding Internet propagation and download times, the soft proofing job ordinarily can be made available to image viewing stations 14 within minutes, if not seconds.

In contrast, preparation of a hard copy proofing job may present substantial delays resulting from the time necessary to produce the job on hard copy proofer 24 and the delivery time from the location of the hard copy proofer to the location of a viewing site 30. Also, as shown in FIG. 2, when it is necessary to accommodate multiple viewers, several physical deliveries via different courier transit paths 28 must be made between the location of hard copy proofer 24 and multiple viewing sites 30, which may be located hundreds or thousands of miles from the original hard copy proofer.

Time delays can be very costly to customers faced with time constraints such as advertising submission deadlines, publishing deadlines, and the like. In addition to time delays, use of hard copy proofer 24 and consumption of hard copy media 26 add significant costs to the hard copy proofing process. Delivery costs add further cost to the hard copy proofing job, and increase with the number of desired viewing sites 30. Accordingly, for comparison, FIG. 2 illustrates some of the workflow, cost, and timing differences between soft proofing jobs and hard copy proofing jobs.

Figure 3:
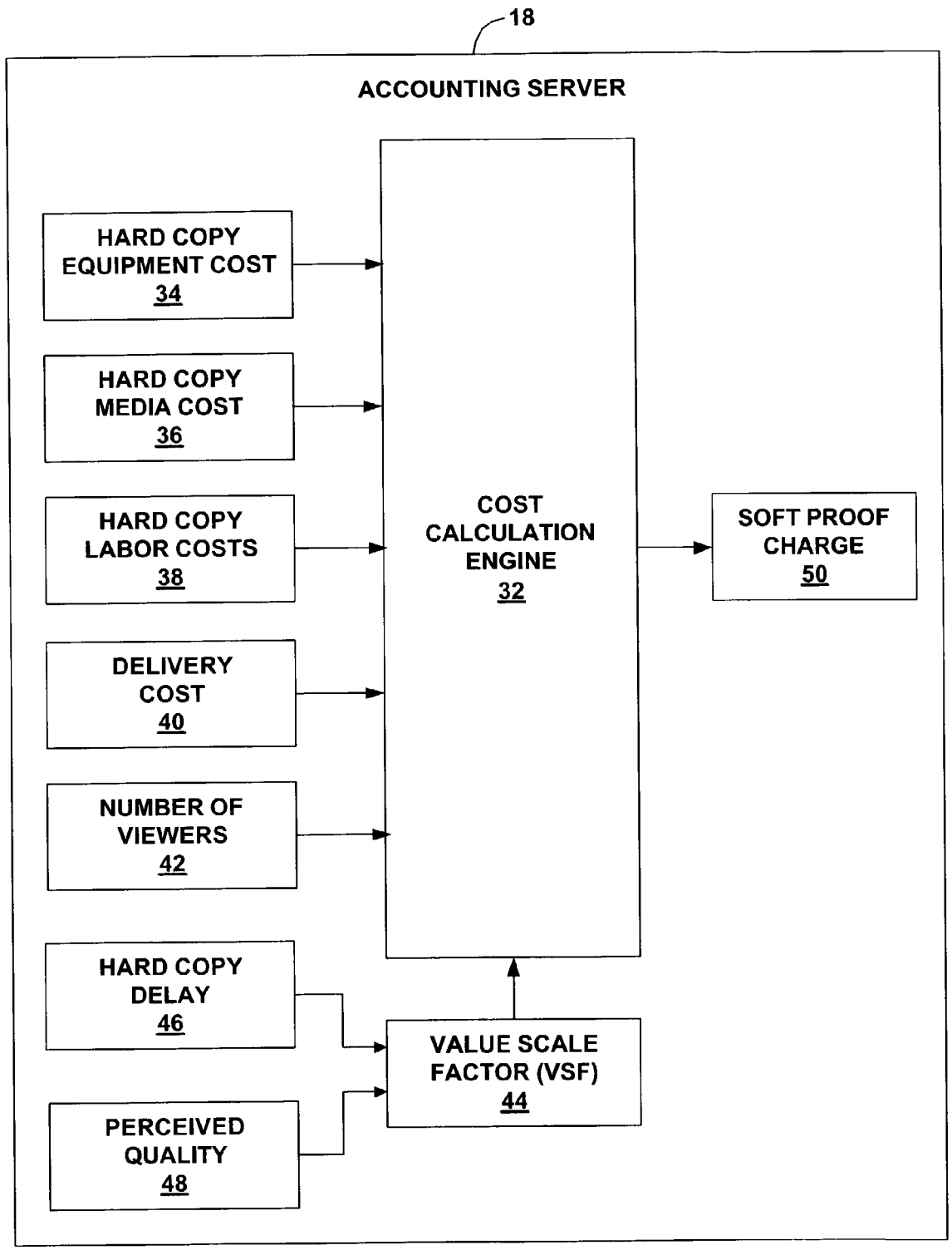
FIG. 3 is a block diagram of an accounting server configured to determine a charge for a soft proofing job based on factors associated with a comparable hard copy proofing job.

FIG. 3 is a block diagram of accounting server 18. In accordance with the invention, accounting server 18 is configured to determine a charge for a soft proofing job based on one or more factors associated with a comparable hard copy proofing job. Again, accounting server 18 may be a process running on an independent server that interacts with color proofing server 16 via network 20. Alternatively, accounting server 18 may be realized by a process that runs with a color proofing process on color proofing server 16, image editing station 12 or some other machine coupled to network 20. In each case, accounting server 18 includes software modules responsible for logging soft proofing job activity and generating appropriate customer charges.

To determine the applicable charge for a soft proofing job, accounting server 18 may take into account one or more factors associated with a comparable hard copy proofing job, such as comparable hard copy equipment costs, hard copy media costs, delivery costs, avoidance of time delays relative to hard copy proofing, and the number of users that view a soft proofing job. With such factors, accounting server 18 may calculate a base cost for a soft proofing job. In some embodiments, based on one or more of the above factors, accounting server 18 may calculate a value scale factor (VSF), and apply the VSF to the base cost for a given soft proofing job, thereby yielding an overall cost that can be charged to the customer.

As shown in FIG. 3, accounting server 18 may include a cost calculation engine 32, embodied as a software module, that accesses information associated with a particular soft proofing job produced by an image editing station 12. The information may be stored in a database for access and retrieval by cost calculation engine 32. For a given soft proofing job, cost calculation engine 32 may access hard copy equipment cost information 34, hard copy media cost information 36, hard copy labor costs 38, delivery cost information 40 and information concerning the number of viewers 42 associated with the soft proofing job. Using this information, cost calculation engine 32 determines a base cost for a soft proofing job.

The various hard copy information 34, 36, 38, delivery cost information 40, and number of viewers 42 may correspond to a comparable hard copy proofing job emulated by the soft proofing job. In addition, cost calculation engine 32 may access a value scale factor (VSF) 44 that pertains to the soft proofing job. VSF 44 may reflect, at least in part, less tangible costs such as a hard copy delay factor 46 representing the costs to the customer of shipping delays or hard copy proofing production delays. In addition, VSF 44 may represent, at least in part, perceived quality differences 48 between the soft proofing job and the comparable hard copy job. Using the various hard copy inputs 34, 36, 38, 40, 42 and VSF 44, cost calculation engine 32 calculates a soft proof charge 50 for the customer. The customer charge may be presented to a customer by any number of modes, such as mail or email, or added to a customer account in an account database, which may be maintained by accounting server 18 or another server.

A soft proofing job, as described herein, generally refers to preparation of a color image for presentation on a display device and review by a customer in order to accurately predict the appearance of the color image when produced by high volume production equipment, e.g., a printing press or other printing device. Thus, the color image may serve as a simulation of a CMYK print image on an additive RGB display or projection device. Of course, other print images such as CMY, CMYKOG, and the like may be simulated by a soft proof image.

A customer generally refers to an entity that requests the soft proofing job, such as a publisher, advertising agency, advertising customer, artist, or the like, or at least the entity that is responsible for payment for a requested soft proofing job. A customer may have multiple image viewing stations 14 located at a single site or several remote sites. The customer may also be responsible for charges associated with image viewing stations 14 used by other entities such as graphic artists that contribute to the proofing process.

Ordinarily, a soft proofing job is intended to emulate the output of a conventional hard copy proof. For example, a particular soft proofing job may be formulated to emulate the output of the Matchprint™ Digital Halftone Proofing System, commercially available from Kodak Polychrome Graphics, Inc. of Norwalk, Conn. In addition, the soft proofing job may be formulated to emulate output using a particular type of media, including specific types of paper, film, and colorants. Colorants may take the form of inks, dyes, donor sheets, or other materials used to form color in a hard copy proofing device.

Often, a customer may specify any of a variety of different hard copy proofers and media for emulation by the soft proofing job. Hence, a comparable hard copy proofing job generally refers to a hard copy proofing job emulated by a soft proofing job. A comparable hard copy proofing job can be distinguished, for example, by the type of hard copy proofing equipment and media used in the hard copy proofing job. There are a variety of processes for creating hard copy proofs including analog halftone proofing processes, such as Matchprint™ and Chromalin™ analog proofing, digital halftone proofing processes, such as Matchprint™ Digital and Kodak Approval™ proofing, and press proofing in which a small printing press is set up with plates similar to those used for a high volume printing jobs.

In the case of analog halftone proofing, the proofs are typically created manually via exposure of colored materials through the same CMYK halftone black and white film separations used to expose the CMYK printing plates for a high volume press. The analog halftone proofing processes are somewhat labor-intensive and generally require a trained technician. The digital halftone proofs are output automatically to a transfer sheet and laminated to various paper stocks. Press proofs often require several thousand prints to be made so that several hundred representative copies can be produced after the system has stabilized with regard to color ("make ready"). The hard copy proofing processes generally produce high quality output, but require labor, equipment, media and time.

Soft color proofing is much less labor-intensive and does not consume media or tie up equipment. However, soft color proofing quality can range from good color accuracy, which enables color checking, to poor color accuracy, which is often reserved for verification of position, shape and size of elements in a page. Some soft proofing systems, such as the Matchprint™ Virtual Proofing System, however, can provide enhanced visual accuracy. Ideally, the soft proofing system should provide visual accuracy between the RGB image and the CMYK hard copy image so close that the soft proof image can replace the functionality of a contract CMYK hard copy proof.

As mentioned above, the factors considered by accounting server 18 in determining the charge for a soft proofing job may include costs associated with the particular hard copy equipment and hard copy media used for a comparable hard copy job. In this manner, accounting server 18 yields a cost that can be determined in correlation with hard copy costs, but charged to the customer responsible for the soft proofing job. The hard copy equipment costs may include a per-job allocation of the overall purchase or lease cost of the equipment. Accounting server 18 may apply an allocation of the hard copy equipment costs on a per-job basis, e.g., in the form of a service charge.

In addition, accounting server 18 may apply a per-sheet or per-job cost for the hard copy media consumed by the comparable hard copy job. In this manner, the size of the soft proofing job, e.g., in terms of the number of pages proofed, can be correlated with the comparable hard copy proofing job costs. Similar charges may be applied based on the amount of colorant consumed by the comparable hard copy proofing job. For example, accounting server 18 may apply an increased charge for a six-color hard copy proofing job relative to a four-color hard copy proofing job.

Delivery costs associated with a comparable hard copy proofing job may also play a role in determination of the customer charge for a soft proofing job by accounting server 18. For hard copy proofing jobs, many customers are accustomed to delivery costs required by a courier to deliver the hard copy proofs from a color proofing technician to the customer. If the color proofing technician is associated with a graphic art firm in New York and the customer resides in Los Angeles, for example, the customer can expect to pay for courier charges, often for overnight delivery. A soft proofing job typically will be delivered electronically, however, via the Internet or some other wide area network, and requires no physical courier service. As a result, the soft proofing job may represent a cost savings. Nevertheless, correlation of the charge for the soft proofing job to the delivery cost may represent perceived value according to the hard copy pricing scheme familiar to a remotely located customer.

The cost of the soft proofing job also may reflect the cost savings in avoiding substantial time delays. For example, accounting server 18 may determine the customer charge in part based on the value of avoiding production and delivery delays. In this case, electronic transmission of a soft proofing job may represent a substantial time and cost savings over physical delivery of a comparable hard copy proofing job. This value may be expressed in VSF 44. In addition, the soft proofing job may avoid delays associated with production of the comparable hard copy proof, including manufacturing and scheduling delays. For example, preparation of a two-page hard copy proof can vary from one minute for a low end digital proof to twenty minutes for a high end digital proof. This value likewise may be expressed in VSF 44. Hence, accounting server 18 may take into account the relative speed advantages of soft color proofing in determining the applicable customer charge.

In addition to hard copy delays, accounting server 18 may also calculate VSF 44 based the perceived quality of the soft proofing job relative to the comparable hard copy proofing job. In this sense, VSF 44 can account for increases or decreases in the perceived quality 48 of each soft proof due to perceived benefit or detriment to the customer.

For example, although a soft proofing job may produce very accurate and consistent output relative to the comparable hard copy proofing job, customers may perceive slightly reduced value because of the mere fact that the soft proofing job is electronic. In other words, customers may be more accustomed to hard copy proofing jobs and perceive a slight difference in the human experience in observing a hard copy proof that can be held in the customer's hand and a soft proof that only exists on the customer's display device.

On the other hand, the soft proof may be more readily disseminated among a group of reviewers at different image viewing stations 14, and provide accelerated turnaround time for processing of change requests. Thus, the exact increase or decrease in the value scale factor may be based on marketing data concerning perceived value, i.e., subjective impressions of customers, that is applied via VSF 44 as a systematic correction to the cost of the hard copy proof that is emulated by the soft color proof.

Figure 4:
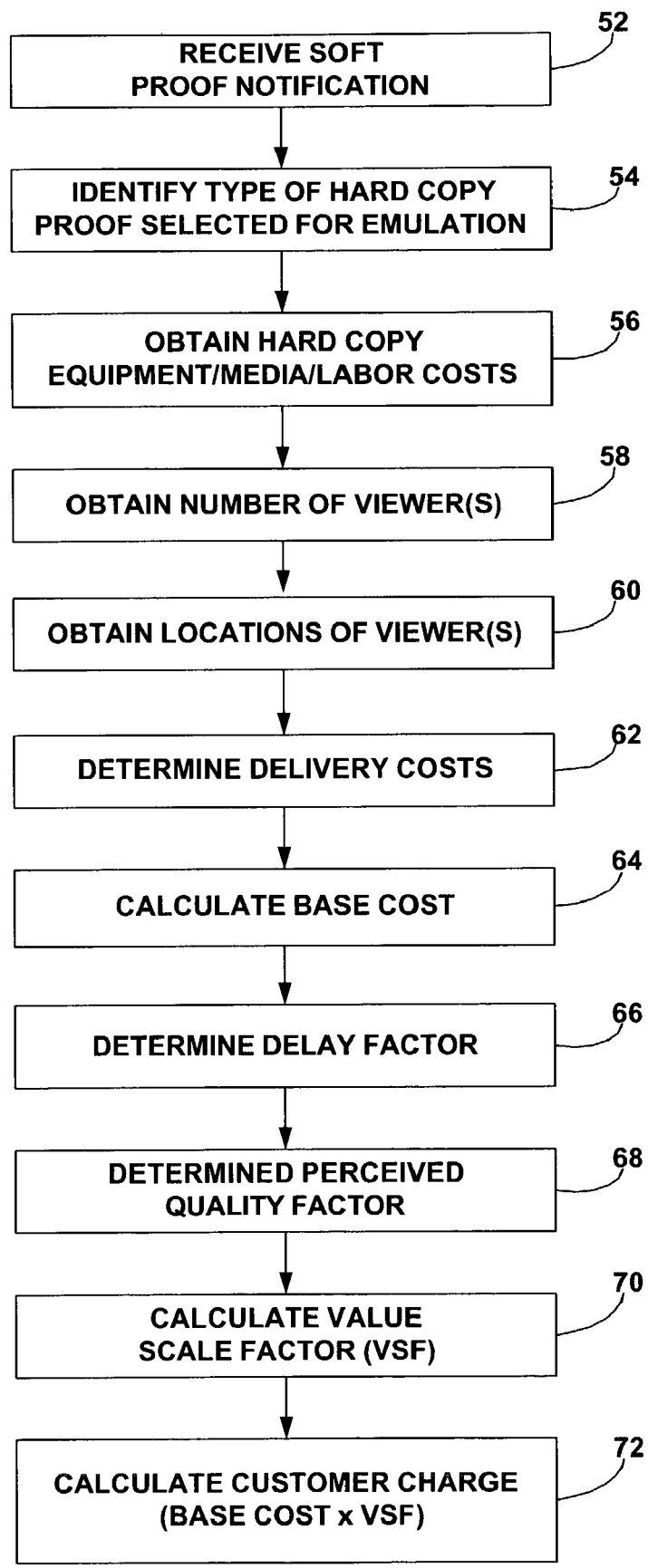
FIG. 4 is a flow diagram illustrating determination of a charge for a soft proofing job based on factors associated with a comparable hard copy proofing job.

FIG. 4 is a flow diagram illustrating determination of a charge for a soft proofing job based on factors associated with a comparable hard copy proofing job. As shown in FIG. 4, upon notification of a soft proof request (52), accounting server 18 identifies the type of hard copy proof selected for emulation in the soft proof (54). Accounting server 18 may receive notification of a new soft proof request from an image editing station 12 or soft proofing server 16, e.g., via network 20. The notification may identify the type of hard copy proof, including equipment and media requirements. In addition, the notification may identify the requesting customer, the number of image viewing stations 14 that will receive the soft proofing job, and the location of the image viewing station(s) 14 to which the soft proofing job will be sent.

To determine the customer charge for the soft proofing job, accounting server 18 obtains the equipment, media and labor costs for a comparable hard copy job (56). In addition, accounting server 18 obtains the number of viewers associated with the soft proofing job (58) and the locations of the viewing stations 14 associated with the viewers (60). Accounting server 18 may obtain the above information from the contents of the notification, or access a database to retrieve the information for the soft proofing job. In the latter case, accounting server 18 may use an index provided with the notification to locate appropriate records in the database. Upon receipt of details concerning a soft proofing job request, for example, image editing station 12 or soft proofing server 16 may populate the database with appropriate records containing the above information.

Using the information concerning the number of viewers and their locations, accounting server 18 determines delivery costs associated with the comparable hard copy job (62). For example, accounting server 18 may correlate the location of image editing station 12 with the locations of pertinent viewing stations 14 to access entries in a delivery cost table. The entries may be further indexed according to a desired level of delivery service, such as next-day, two-day, ground transport, or the like, and the weight of the parcel to be delivered. Level of service and weight details also may be set forth in the soft proofing job notification or in database records created for the soft proofing job.

Based on the hard copy equipment, media, labor and delivery costs, accounting server 18 determines a base cost (64) for the soft proofing job. As further shown in FIG. 4, accounting server 18 also determines a delay factor (66) and perceived quality factor (68) to calculate the value scale factor (VSF) (70). Again, the delay factor is a weighting or other value that represents the cost or undesirability of the delays associated with delivery and production of a comparable hard copy proofing job. The perceived quality factor is a weighting or other value that quantifies relative quality differences between hard copy and soft proofing jobs, as perceived by soft proofing customers. The delay factor may be obtained by accessing production delay factor values indexed in a table according to the type and length of hard copy proofing job, and accessing delivery delay factor values indexed in a table according to the locations of image viewing stations 14 relative to image editing station 12 and the level of delivery service selected.

Using the base cost and the value scale factor, accounting server 18 calculates the soft proof customer charge (72), e.g., as follows:

Customer Charge=VSF×Base Cost

Again, the VSF may account for increases or decreases in the value of each soft proofing job due to perceived benefits or detriments to the customer. The perceived quality aspect of the VSF may be quantified based on marketing data, e.g., as a scale factor that indicates relative quality. The scale factor can be stored according to a particular soft copy vs. hard copy emulation relationship. In other words, the scale factor may reflect how well a given soft copy proofing system emulates a particular type of hard copy proofing output. Similarly, production and delivery delays can be analyzed for particular hard copy equipment and media and particular delivery routes, and stored in a table for access in calculating the VSF.

Figure 5:
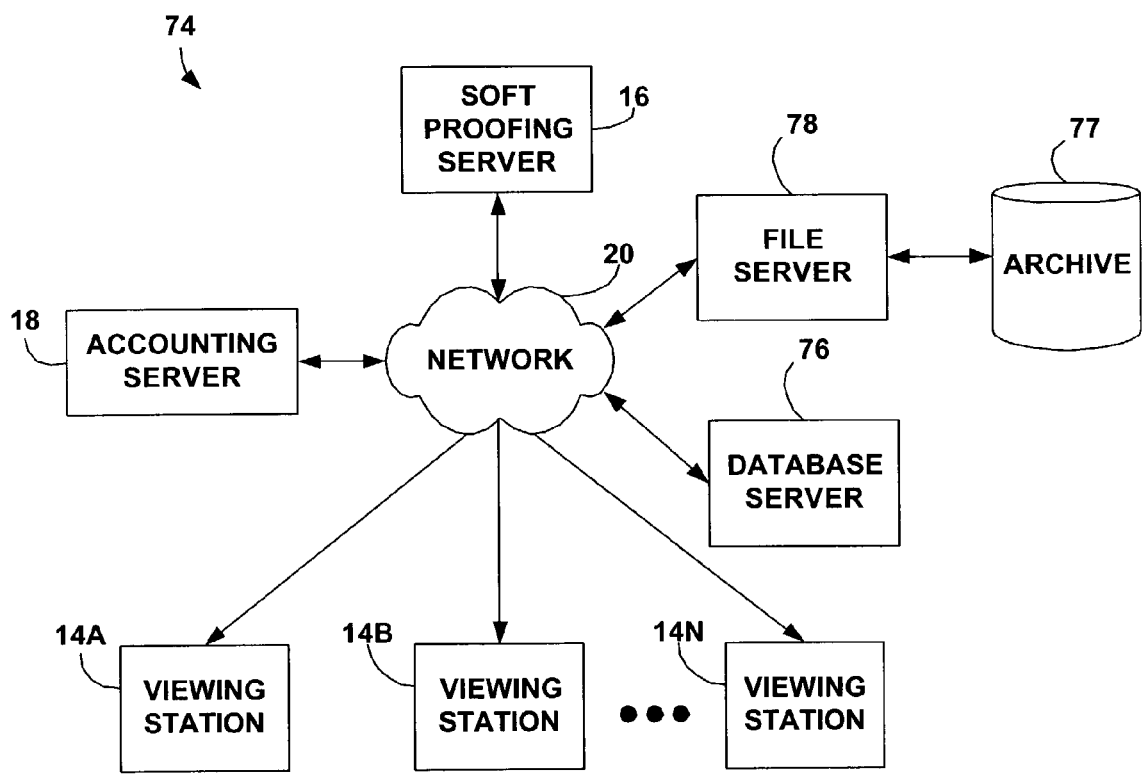
FIG. 5 is a block diagram illustrating a system for delivery of soft proofing jobs to multiple viewing stations.

FIG. 5 is a block diagram illustrating a system 74 for delivery of soft proofing jobs to multiple viewing stations 14. System 74 may form part of a system similar to system 10 illustrated in FIG. 1. In the example of FIG. 5, a number of viewing stations 14 interact with soft proofing server 16 via network 20 to access soft proofing jobs organized by a database server 76 and stored in an archive 77. For example, a particular image viewing station 14 may request a soft proofing job from soft proofing server 16, which interacts with database server 72 to identify database entries for the pertinent job within archive 77. Soft proofing server 16 then accesses the information identified by the database entries via a file server 78 and network 20. Although network access to archive 77 is shown in FIG. 5 for purposes of illustration, soft proofing server 16, database server 76, archive 77 and file server 78 may be colocated, for example, and communicate via a local area network. In the example of FIG. 5, archive 77 may store both the soft color proofing jobs themselves and the information associated with each job for determination of a customer charge.

Figure 6:
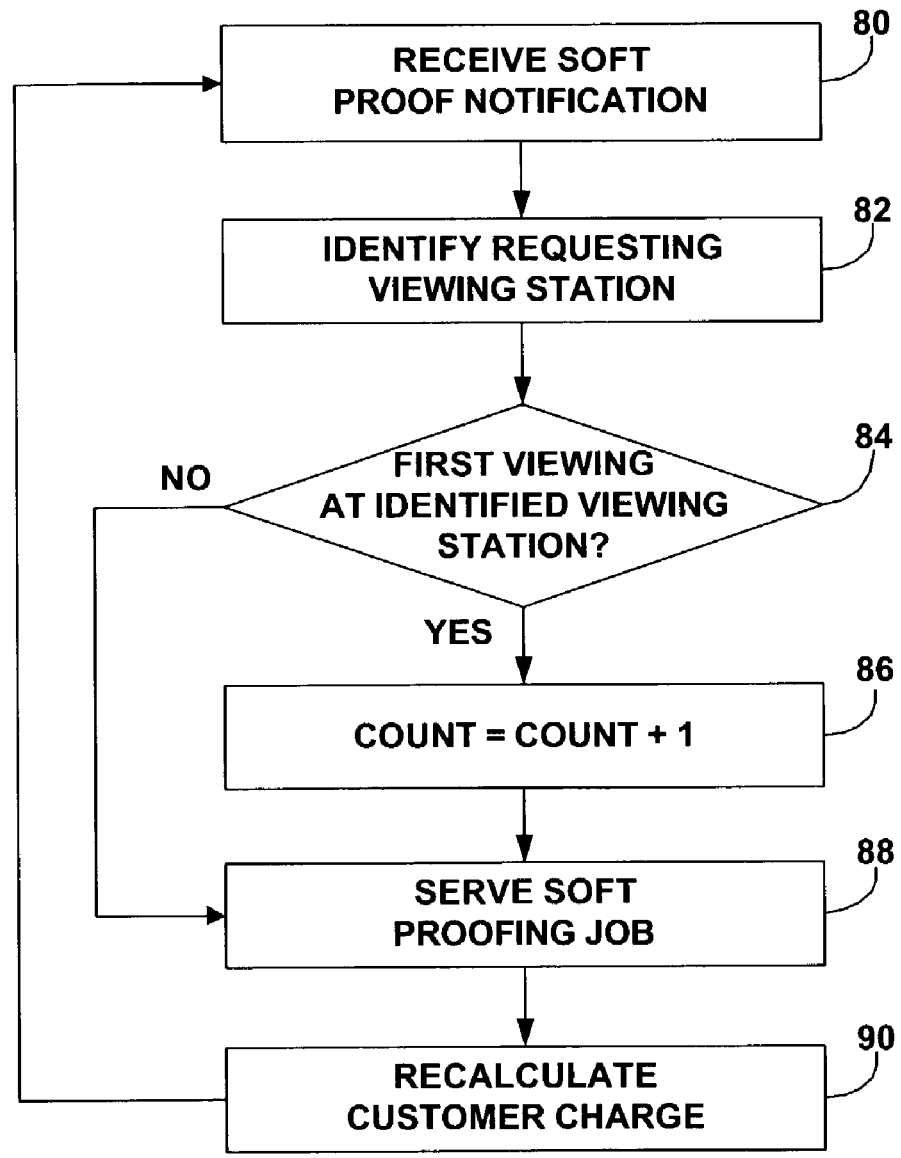
FIG. 6 is a flow diagram illustrating a technique for tracking the number of viewers for a soft proofing job.

FIG. 6 is a flow diagram illustrating a technique for tracking the number of viewers for a soft proofing job. In particular, FIG. 6 contemplates the allocation of additional charges to a basic customer charge when new users access the soft color proofing job, e.g., via different image viewing stations 14. As shown in FIG. 6, accounting server 18 may receive a soft proof notification (80) not only upon receipt of a new soft proofing job request, but also upon receipt of a request for access to an existing soft proofing job. For example, when soft proofing server 16 receives a request for access to a soft proofing job, it may send a notification to accounting server 18 via network 20.

The notification may include an identity associated with a particular image viewing station 14 by which a user requested access. In this manner, accounting server 18 can identify the requesting image viewing station 14 (82). Upon identifying image viewing station 14, accounting server 18 then determines whether the soft proofing job has been previously viewed at the pertinent viewing station or whether the requested viewing is the first viewing (84), i.e., whether the soft proofing job is being viewed by a new viewer. If the soft proofing job is being viewed for the first time, accounting server 16 increments a counter (86) to signify another viewing that warrants an incremental increase in the customer charge. In parallel, soft proofing server 16 serves the soft proofing job to the image viewing station 14 (88). If the soft proofing job is not being viewed for the first time, color proofing server 16 simply serves the soft proofing job to the pertinent viewing station 14 (88).

Accounting server 18 then recalculates the customer charge (90) to reflect an additional charge in the event the image viewing station 14 is viewing the soft proofing job for the first time. In this example, accounting server 18 is configured to increase the customer charge when a new image viewing station 14 requests access to the soft proofing job. However, accounting server 18 does not charge for additional viewings by an image viewing station 14 that has already accessed the soft proofing job. In this manner, a customer may receive unlimited viewings at image viewing stations 14 that have already been used to access the soft proofing job, and only pay additional charges as the scope of distribution of the soft proofing job expands. The amount of the additional charges may take into account the cost of reproducing additional copies of a comparable hard copy proofing job, as well as delivery costs that may be associated with distribution of the hard copy proofing job to locations associated with the image viewing stations 14 that view the soft proofing job for the first time.

The example of FIG. 6 is provided for purposes of illustration only and should not be considered limiting of the techniques described herein. Accordingly, in some embodiments, accounting server 18 could be configured to generate additional charges for viewings even though an image viewing station 14 has already been used to access a soft proofing job. In some cases, the additional charges could be allocated for different levels of viewing. For example, a first charge woud cover up to X viewings, a second charge could be allocation between X and Y viewings, and so forth. In addition, accounting server 18 may be configured to avoid generation of additional charges for image viewing stations 14 that reside within a common workgroup. In other words, image viewing stations assigned to a particular workgroup may be authorized to view soft proofing jobs on an unlimited basis with further charges once a charge is allocated for an additional viewing.

Various embodiments of the invention have been described. These and other embodiments are within the scope of the following claims.

The invention claimed is:

1. A method comprising:
   determining a cost associated with hard copy equipment used for a hard copy proofing job;
   determining a cost associated with hard copy media used for the hard copy proofing job;
   determining a cost associated with delivery of the hard copy proofing job to a customer; and
   determining a charge for a soft proofing job that approximates the hard copy proofing job based on the determined costs and a number of viewers that access the soft proofing job.

2. The method of claim 1, wherein determining the charge includes:
   determining a base charge for the soft proofing job;
   determining a value scale factor for the soft proofing job; and
   multiplying the base charge by the value scale factor to determine the charge for the soft copy proofing job.

3. The method of claim 2, further comprising determining the value scale factor based at least in part on perceived quality differences between the soft proofing job and the comparable hard copy job and delay differences between the soft proofing job and the comparable hard copy job.

4. A system comprising:
   a color proofing server that serves a soft proofing job to a user; and
   an accounting server that determines a cost associated with hard copy equipment used for a hard copy proofing job, a cost associated with hard copy media used for the hard copy proofing job, a cost associated with delivery of the hard copy proofing job to a customer, and a charge for a soft proofing job that approximates the hard copy proofing job based on the determined costs and a number of viewers that access the soft proofing job.

5. The system of claim 4, wherein the accounting server determines the charge by determining a base charge for the soft proofing job, determining a value scale factor for the soft proofing job, and multiplying the base charge by the value scale factor to determine the charge for the soft copy proofing job.

6. The method of claim 5, wherein the accounting server determines the value scale factor based at least in part on perceived quality differences between the soft proofing job and the comparable hard copy job and delay differences between the soft proofing job and the comparable hard copy job.

7. A computer-readable medium comprising instructions that, when executed, determine a cost associated with hard copy equipment used for a hard copy proofing job, determine a cost associated with hard copy media used for the hard copy proofing job, determine a cost associated with delivery of the hard copy proofing job to a customer, and determine a charge for a soft proofing job that approximates the hard copy proofing job based on the determined costs and a number of viewers that access the soft proofing job.

8. The computer-readable medium of claim 7, wherein the instructions, when executed, determine the charge by determining a base charge for the soft proofing job, determining a value scale factor for the soft proofing job, and multiplying the base charge by the value scale factor to determine the charge for the soft copy proofing job.

9. The computer-readable medium of claim 8, wherein the instructions, when executed, determine the value scale factor based at least in part on quality differences between the soft proofing job and the comparable hard copy job and delay differences between the soft proofing job and the comparable hard copy job.

* * * * *